United States Patent
Sakaida et al.

(10) Patent No.: US 12,148,878 B2
(45) Date of Patent: Nov. 19, 2024

(54) LITHIUM ION CONDUCTIVE SOLID ELECTROLYTE MATERIAL, AND BATTERY USING SAME

(71) Applicant: Panasonic Intellectual Property Management Co., Ltd., Osaka (JP)

(72) Inventors: Masashi Sakaida, Hyogo (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 691 days.

(21) Appl. No.: 17/327,795

(22) Filed: May 24, 2021

(65) Prior Publication Data

US 2021/0280906 A1    Sep. 9, 2021

Related U.S. Application Data

(63) Continuation of application No. PCT/JP2019/037203, filed on Sep. 24, 2019.

(30) Foreign Application Priority Data

Dec. 28, 2018 (JP) ................................ 2018-248584

(51) Int. Cl.
    *H01M 10/0562* (2010.01)
(52) U.S. Cl.
    CPC .. *H01M 10/0562* (2013.01); *H01M 2300/008* (2013.01)

(58) Field of Classification Search
    CPC ..... H01M 2300/0065–0068; H01M 2300/071; H01M 2300/008
    See application file for complete search history.

(56) References Cited

U.S. PATENT DOCUMENTS

| | | |
|---|---|---|
| 2012/0301796 A1 | 11/2012 | Ohtomo et al. |
| 2015/0044575 A1 | 2/2015 | Kawaji et al. |

FOREIGN PATENT DOCUMENTS

| | | |
|---|---|---|
| JP | 2003-257241 A | 9/2003 |
| JP | 2006-244734 | 9/2006 |
| JP | 2011-129312 | 6/2011 |
| WO | 2015/079509 A1 | 6/2015 |

OTHER PUBLICATIONS

WO2015079509A1_annotated machine translation (Year: 2015).*
International Search Report of PCT application No. PCT/JP2019/037203 dated Nov. 26, 2019.
The Extended European Search Report dated Jan. 20, 2022 for the related European Patent Application No. 19903854.8.

* cited by examiner

*Primary Examiner* — Haroon S. Sheikh
*Assistant Examiner* — Aryana Y. Ortiz
(74) *Attorney, Agent, or Firm* — Rimon P.C.

(57) ABSTRACT

The present disclosure provides a solid electrolyte material having high lithium ion conductivity. A lithium ion conductive solid electrolyte material according to the present disclosure comprises Li, La, O, and X. X is at least one element selected from the group consisting of Cl, Br, and I.

11 Claims, 3 Drawing Sheets

LITHIUM ION CONDUCTIVE SOLID ELECTROLYTE MATERIAL, AND BATTERY USING SAME

BACKGROUND

1. Technical Field

The present invention relates to a lithium ion conductive solid electrolyte material and a battery using the same.

BACKGROUND ART

Japanese Unexamined Patent Application Publication No. 2011-129312 discloses an all-solid battery including a sulfide solid electrolyte material. Japanese Unexamined Patent Application Publication No. 2006-244734 discloses an all-solid battery including a halide solid electrolyte material containing indium.

SUMMARY

One non-limiting and exemplary embodiment provides a solid electrolyte material having high lithium ion conductivity.

In one general aspect, the techniques disclosed here feature a lithium ion conductive solid electrolyte material comprises Li, La, O, and X, where X is at least one element selected from the group consisting of Cl, Br, and I.

The present disclosure provides a solid electrolyte material having high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
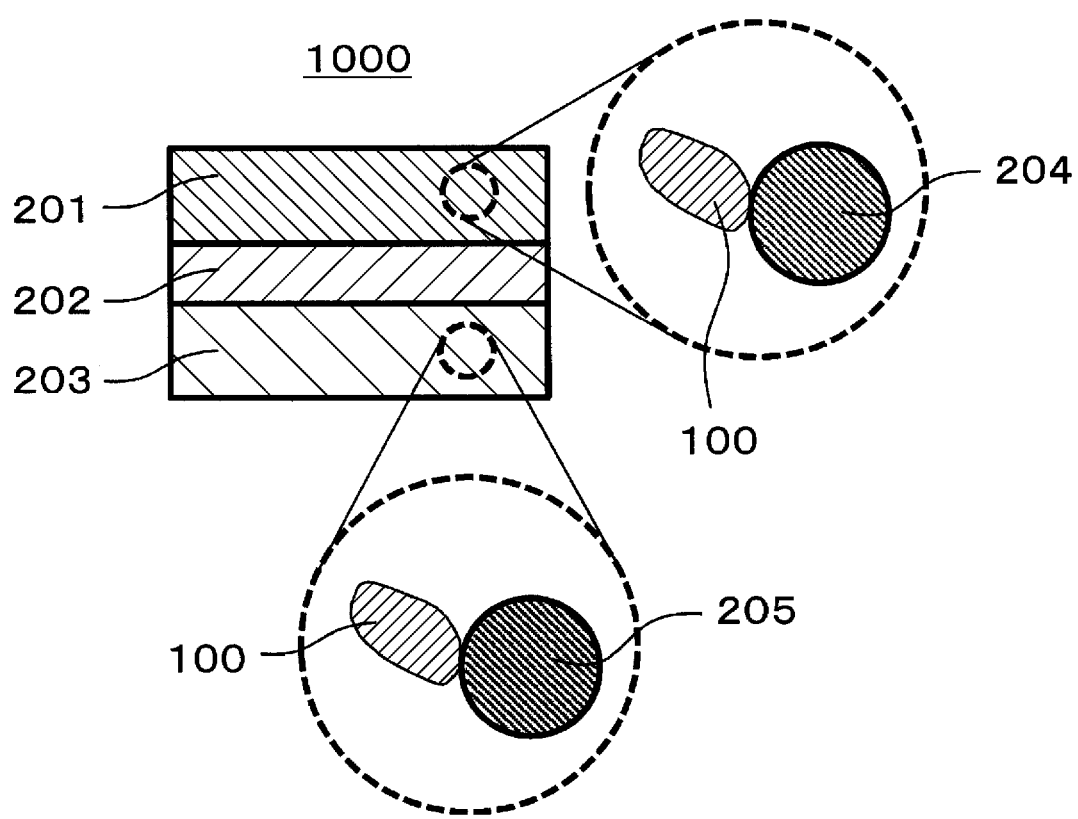
FIG. 1 is a sectional view of a battery 1000 according to a second embodiment.

The embodiments according to the present disclosure will be described below with reference to the drawings.

First Embodiment

A lithium ion conductive solid electrolyte material according to a first embodiment (hereafter referred to as "solid electrolyte material according to the first embodiment") comprises Li, La, O, and X. X is at least one element selected from the group consisting of Cl, Br, and I. The solid electrolyte material according to the first embodiment has high lithium ion conductivity.

The solid electrolyte material according to the first embodiment may be used for obtaining a battery having excellent charge-discharge characteristics. An example of the battery is an all-solid secondary battery.

Since the solid electrolyte material according to the first embodiment does not contain sulfur, hydrogen sulfide is not generated even in the case of exposure to the air. As a result, the solid electrolyte material according to the first embodiment has excellent safety. Such a solid electrolyte material may be used for obtaining a battery having excellent safety. It should be noted that hydrogen sulfide may be generated when the sulfide solid electrolyte material disclosed in Japanese Unexamined Patent Application Publication No. 2011-129312 is exposed to the air.

Regarding the solid electrolyte material according to the first embodiment, the amount of moles of the element X constituting the solid electrolyte material (that is, the amount of moles of X contained) may be greater than the amount of moles of O (that is, oxygen) constituting the solid electrolyte material (that is, the amount of moles of O contained). Such a solid electrolyte material has high lithium ion conductivity.

The solid electrolyte material according to the first embodiment may be a material denoted by Composition formula (1) below, $$Li_{2+b-3a}La_aOX_b \qquad (1)$$

herein mathematical formulae below $$1.0 \leq a \leq 2.0 \text{ and}$$

$$1.5 \leq b \leq 6.0$$

are satisfied.

The solid electrolyte material denoted by Composition formula (1) has high lithium ion conductivity.

To further increase the ionic conductivity of the solid electrolyte material, X may contain at least one element selected from the group consisting of Br and I.

The solid electrolyte material according to the first embodiment may be crystalline or may be amorphous.

There is no particular limitation regarding the shape of the solid electrolyte material according to the first embodiment. Examples of the shape include needle-like shapes, spherical shapes, and ellipsoidal shapes. The solid electrolyte material according to the first embodiment may be particles. The solid electrolyte material according to the first embodiment may be formed so as to have the shape of pellets or plates.

In the case in which the shape of the solid electrolyte material according to the first embodiment is granular (for example, spherical), the solid electrolyte material according to the first embodiment may have a median diameter greater than or equal to 0.1 μm and less than or equal to 100 μm. Desirably, the median diameter may be greater than or equal to 0.5 μm and less than or equal to 10 μm. The median diameter denotes a particle diameter when the cumulative volume in the volume-based particle diameter distribution is equal to 50%. The volume-based particle diameter distribution may be measured by using a laser diffraction measuring apparatus or an image analyzer.

To favorably disperse the solid electrolyte material according to the first embodiment and an active material, the solid electrolyte material according to the first embodiment may have a smaller median diameter than the active material.

Method for Producing Solid Electrolyte Material

The solid electrolyte material according to the first embodiment may be produced by a method described below.

To have a predetermined composition, for example, raw material powders of a halide are mixed. As an example, in the case in which a predetermined composition is $Li_{0.8}La_{1.4}OCl_{1.5}Br_{1.5}$, a LiCl raw material powder, a LiBr raw material powder, a LaOBr raw material powder, and a $LaCl_3$ raw material powder are mixed at a $LiCl:LiBr:LaOBr:LaCl_3$ molar ratio of 0.3:0.5:1.0:0.4. LaOBr is obtained by mixing a $La_2O_3$ raw material powder and a $NH_4Br$ raw material powder at a $La_2O_3:NH_4Br$ molar ratio of 1:2 and, thereafter, performing firing at 400° C. for 5 hours. The raw material powders may be mixed at a molar ratio adjusted in advance so as to negate a change in the composition that may occur during a synthesis process.

The raw material powders mechanochemically react with each other in a mixer such as a planetary ball mill (through a mechanochemical milling treatment method) so as to produce a product. The product may be fired in a vacuum or in an inert atmosphere (for example, an argon atmosphere or a nitrogen atmosphere). Alternatively, a product mixture may be fired in a vacuum or in an inert atmosphere so as to obtain a product.

Firing may be performed at higher than or equal to 100° C. and lower than or equal to 400° C. for greater than or equal to 1 hour. To suppress a change in the composition due to firing, firing may be performed in a hermetically sealed container such as a quartz tube.

The solid electrolyte material according to the first embodiment can be obtained by using these methods.

Second Embodiment

A second embodiment will be described below. Matters described in the first embodiment may be appropriately omitted.

A battery according to the second embodiment includes a positive electrode, an electrolyte layer, and a negative electrode. The electrolyte layer is disposed between the positive electrode and the negative electrode. At least one selected from the group consisting of the positive electrode, the electrolyte layer, and the negative electrode contains the solid electrolyte material according to the first embodiment. The battery according to the second embodiment has excellent charge-discharge characteristics.

FIG. 1 is a sectional view of a battery 1000 according to the second embodiment.

The battery 1000 according to the second embodiment includes a positive electrode 201, an electrolyte layer 202, and a negative electrode 203. The electrolyte layer 202 is disposed between the positive electrode 201 and the negative electrode 203.

The positive electrode 201 includes positive electrode active material particles 204 and solid electrolyte particles 100.

The electrolyte layer 202 contains an electrolyte material (for example, a solid electrolyte material).

The negative electrode 203 contains negative electrode active material particles 205 and solid electrolyte particles 100.

The solid electrolyte particle 100 is a particle containing the solid electrolyte material according to the first embodiment as a primary component. The particle containing the solid electrolyte material according to the first embodiment as a primary component denotes a particle in which a component contained in the largest amount is the solid electrolyte material according to the first embodiment. The solid electrolyte particle 100 may be composed of the solid electrolyte material according to the first embodiment.

The positive electrode 201 contains a material capable of occluding and releasing metal ions (for example, lithium ions). The positive electrode 201 contains, for example, a positive electrode active material (for example, the positive electrode active material particles 204).

Examples of the positive electrode active material include lithium-containing transition metal oxides, transition metal fluorides, polyanionic materials, fluorized polyanionic materials, transition metal sulfides, transition metal oxyfluorides, transition metal oxysulfides, and transition metal oxynitrides.

Examples of the lithium-containing transition metal oxide include $LiNi_{1-d-f}Co_dAl_fO_2$ (where 0<d, 0<f, and 0<(d+f)<1) and $LiCoO_2$.

From the viewpoint of the cost and the safety of the battery, lithium phosphate may be used as the positive electrode active material.

In the case in which the positive electrode 201 contains the solid electrolyte material according to the first embodiment and X contains I (that is, iodine), lithium iron phosphate may be used as the positive electrode active material. The solid electrolyte material according to the first embodiment containing I is readily oxidized. The lithium iron phosphate being used as the positive electrode active material suppresses an oxidation reaction of the solid electrolyte material from occurring. That is, an oxidized layer having low lithium ion conductivity is suppressed from being formed. As a result, the battery has a high charge-discharge efficiency.

The positive electrode 201 may contain not only the solid electrolyte material according to the first embodiment but also a transition metal oxyfluoride as the positive electrode active material. Even when the solid electrolyte material according to the first embodiment is oxidized by the transition metal oxyfluoride, a resistive layer is not readily formed. As a result, the battery has a high charge-discharge efficiency.

The transition metal oxyfluoride contains oxygen and fluorine. As an example, the transition metal oxyfluoride may be a compound denoted by $Li_pMe'_qO_mF_n$. Here, Me' is at least one element selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P, and the following formulae $0.5 \leq p \leq 1.5$, $0.5 \leq q \leq 1.0$, $1 \leq m < 2$, and $0 < n \leq 1$ are satisfied. Examples of such a transition metal oxyfluoride include $Li_{1.05}(Ni_{0.35}Co_{0.35}Mn_{0.3})_{0.95}O_{1.9}F_{0.1}$.

The positive electrode active material particles 204 may have a median diameter greater than or equal to 0.1 μm and less than or equal to 100 μm. In the case in which the positive electrode active material particles 204 have a median diameter greater than or equal to 0.1 μm, in the positive electrode, the positive electrode active material particles 204 and the solid electrolyte particles 100 can be favorably dispersed. Consequently, the charge-discharge characteristics of the battery are improved. In the case in which the positive electrode active material particles 204 have a median diameter less than or equal to 100 μm, the lithium diffusion rate in the positive electrode active material particles 204 is increased. Consequently, the battery can function with a high output.

The positive electrode active material particles 204 may have a greater median diameter than the solid electrolyte particles 100. Consequently, the positive electrode active material particles 204 and the solid electrolyte particles 100 can be favorably dispersed.

From the viewpoint of the energy density and the output of the battery, in the positive electrode 201, the ratio of the volume of the positive electrode active material particles 204 to the total of the volume of the positive electrode active material particles 204 and the volume of the solid electrolyte particles 100 may be greater than or equal to 0.30 and less than or equal to 0.95.

Figure 2:
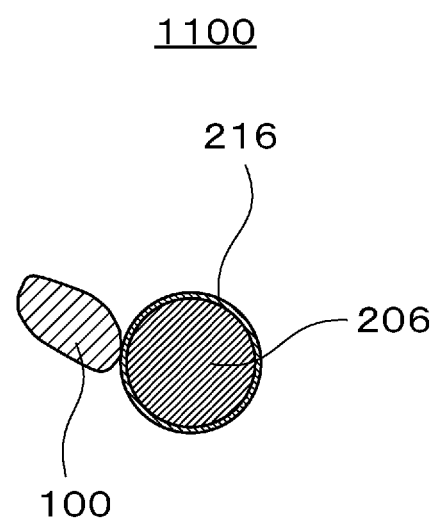
FIG. 2 is a sectional view of an electrode material 1100 according to the second embodiment.

FIG. 2 is a sectional view of an electrode material 1100 according to the second embodiment. The electrode material 1100 is contained in, for example, the positive electrode 201. To prevent an electrode active material particle 206 from reacting with the solid electrolyte particle 100, a cover layer 216 may be formed on the surface of the electrode active material particle 206. Consequently, a reaction overvoltage of the battery is suppressed from increasing. Examples of the cover material contained in the cover layer 216 include sulfide solid electrolytes, oxide solid electrolytes, and halide solid electrolytes.

In the case in which the solid electrolyte particle 100 is a sulfide solid electrolyte, the cover material may be the solid electrolyte material according to the first embodiment, and X may be at least one element selected from the group consisting of Cl and Br. Such a solid electrolyte material according to the first embodiment is hard to oxidize compared with the sulfide solid electrolyte. As a result, a reaction overvoltage of the battery is suppressed from increasing.

In the case in which the solid electrolyte particle 100 is a solid electrolyte material according to the first embodiment, and X contains I, the cover material may be the solid electrolyte material according to the first embodiment, and X may be at least one element selected from the group consisting of Cl and Br. The solid electrolyte material according to the first embodiment not containing I is hard to oxidize compared with the solid electrolyte material according to the first embodiment containing I. Consequently, the battery has a high charge-discharge efficiency.

In the case in which the solid electrolyte particle 100 is a solid electrolyte material according to the first embodiment, and X contains I, the cover material may be an oxide solid electrolyte. The oxide solid electrolyte may be lithium niobate having excellent stability even at a high potential. Consequently, the battery has a high charge-discharge efficiency.

The positive electrode 201 may be composed of a first positive electrode layer containing a first positive electrode active material and a second positive electrode layer containing a second positive electrode active material. Here, the second positive electrode layer is arranged between the first positive electrode layer and the electrolyte layer 202, the first positive electrode layer and the second positive electrode layer contain the solid electrolyte material according to the first embodiment not containing I, the electrolyte layer 202 contains the solid electrolyte material according to the first embodiment containing I, and the cover layer is formed on the surface of the second positive electrode active material. According to the above-described configuration, the solid electrolyte material according to the first embodiment contained in the electrolyte layer 202 can be suppressed from being oxidized by the second positive electrode active material. As a result, the battery has a high charge efficiency. Examples of the cover material contained in the cover layer include sulfide solid electrolytes, oxide solid electrolytes, polymer solid electrolytes, and halide solid electrolytes. In this regard, in the case in which the cover material is a halide solid electrolyte, I is not included in the halogen elements. The first positive electrode active material may be the same material as the second positive electrode active material or may be a material different from the second positive electrode active material.

From the viewpoint of the energy density and the output of the battery, the thickness of the positive electrode 201 may be greater than or equal to 10 μm and less than or equal to 500 μm.

The electrolyte layer 202 contains an electrolyte material. The electrolyte material is, for example, a solid electrolyte material. The electrolyte layer 202 may be a solid electrolyte layer.

The electrolyte layer 202 may be composed of just the solid electrolyte material according to the first embodiment.

The electrolyte layer 202 may be composed of just a solid electrolyte material different from the solid electrolyte material according to the first embodiment.

Examples of the solid electrolyte material different from the solid electrolyte material according to the first embodiment include $Li_2MgX_4$, $Li_2FeX_4$, $Li(Al,Ga,In)X_4$, $Li_3(Al, Ga,In)X_6$, and LiI. Here, X is at least one element selected from the group consisting of F, Cl, Br, and I.

Hereafter, the solid electrolyte material according to the first embodiment is referred to as a first solid electrolyte material. The solid electrolyte material different from the solid electrolyte material according to the first embodiment is referred to as a second solid electrolyte material.

The electrolyte layer 202 may contain not only the first solid electrolyte material but also the second solid electrolyte material. In the electrolyte layer 202, the first solid electrolyte material and the second solid electrolyte material may be uniformly dispersed.

The electrolyte layer 202 may have a thickness greater than or equal to 1 μm and less than or equal to 100 μm. In the case in which the electrolyte layer 202 has a thickness greater than or equal to 1 μm, a short circuit between the positive electrode 201 and the negative electrode 203 does not readily occur. In the case in which the electrolyte layer 202 has a thickness less than or equal to 100 μm, the battery can function with a high output.

The negative electrode 203 contains a material capable of occluding and releasing metal ions (for example, lithium ions). The negative electrode 203 contains, for example, a negative electrode active material (for example, the negative electrode active material particles 205).

Examples of the negative electrode active material include metal materials, carbon materials, oxides, nitrides, tin compounds, and silicon compounds. The metal material may be a simple metal or an alloy. Examples of the metal material include lithium metal and lithium alloys. Examples of the carbon material include natural graphite, coke, graphitizing carbon, carbon fiber, spherical carbon, artificial carbon, and amorphous carbon. From the viewpoint of the capacity density, favorable examples of the negative electrode active material include silicon (that is, Si), tin (that is, Sn), silicon compounds, and tin compounds.

The negative electrode active material may be selected in accordance with the reduction resistance of the solid electrolyte material contained in the negative electrode 203. In the case in which the negative electrode 203 contains a solid electrolyte material according to the first embodiment, a material capable of occluding and releasing lithium ions at greater than or equal to 0.27 V with respect to lithium may be used as the negative electrode active material. The negative electrode active material being such a material enables the solid electrolyte material according to the first embodiment contained in the negative electrode 203 to be suppressed from being reduced. As a result, the battery has a high charge-discharge efficiency. Examples of the material include titanium oxides, indium metal, and lithium alloys. Examples of titanium oxide include $Li_4Ti_5O_{12}$, $LiTi_2O_4$, and $TiO_2$.

The negative electrode active material particles 205 may have a median diameter greater than or equal to 0.1 μm and less than or equal to 100 μm. In the case in which the negative electrode active material particles 205 have a median diameter greater than or equal to 0.1 μm, in the negative electrode, the negative electrode active material particles 205 and the solid electrolyte particles 100 can be favorably dispersed. Consequently, the charge-discharge characteristics of the battery are improved. In the case in which the negative electrode active material particles 205 have a median diameter less than or equal to 100 μm, the lithium diffusion rate in the negative electrode active material particles 205 is improved. Consequently, the battery can function with a high output.

The negative electrode active material particles 205 may have a greater median diameter than the solid electrolyte particles 100. Consequently, the negative electrode active material particles 205 and the solid electrolyte particles 100 can be favorably dispersed.

From the viewpoint of the energy density and the output of the battery, in the negative electrode 203, the ratio of the volume of the negative electrode active material particles 205 to the total of the volume of the negative electrode active material particles 205 and the volume of the solid electrolyte particles 100 may be greater than or equal to 0.30 and less than or equal to 0.95.

The electrode material 1100 illustrated in FIG. 2 may be contained in the negative electrode 203. To prevent the solid electrolyte particle 100 from reacting with a negative electrode active material (that is, electrode active material particle 206), a cover layer 216 may be formed on the surface of the electrode active material particle 206. Consequently, the battery has a high charge-discharge efficiency. Examples of the cover material contained in the cover layer 216 include sulfide solid electrolytes, oxide solid electrolytes, polymer solid electrolytes, and halide solid electrolytes.

In the case in which the solid electrolyte particle 100 is a solid electrolyte material according to the first embodiment, the cover material may be a sulfide solid electrolyte or a polymer solid electrolyte. Examples of the sulfide solid electrolyte include $Li_2S$—$P_2S_5$ and trilithium phosphate. Examples of the polymer solid electrolyte include complex compounds of a polyethylene oxide and a lithium salt. An example of such a polymer solid electrolyte is lithium bis(trifluoromethanesulfonyl)imide.

From the viewpoint of the energy density and the output of the battery, the negative electrode 203 may have a thickness greater than or equal to 10 μm and less than or equal to 500 μm.

For the purpose of enhancing the ionic conductivity, the chemical stability, and the electrochemical stability, at least one selected from the group consisting of the positive electrode 201, the electrolyte layer 202, and the negative electrode 203 may contain the second solid electrolyte material. Examples of the second solid electrolyte material include sulfide solid electrolytes, oxide solid electrolytes, halide solid electrolytes, and organic polymer solid electrolytes.

In the present disclosure, "sulfide solid electrolyte" denotes a solid electrolyte containing sulfur. "Oxide solid electrolyte" denotes a solid electrolyte containing oxygen. The oxide solid electrolyte may contain an anion other than oxygen (where a sulfur anion and a halogen anion are excluded). "Halide solid electrolyte" denotes a solid electrolyte containing a halogen atom and not containing sulfur. The halide solid electrolyte may contain not only a halogen element but also oxygen.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

Examples of the oxide solid electrolyte include
(i) NASICON-type solid electrolytes such as $LiTi_2(PO_4)_3$ or element substitution products thereof,
(ii) Perovskite-type solid electrolytes such as $(LaLi)TiO_3$,
(iii) LISICON-type solid electrolytes such as $Li_{14}ZnGe_4O_{16}$, $Li_4SiO_4$, or $LiGeO_4$ or element substitution products thereof,
(iv) Garnet-type solid electrolytes such as $Li_7La_3Zr_2O_{12}$ or element substitution products thereof, and
(v) $Li_3PO_4$ or N-substitution products thereof.

Examples of the halide solid electrolyte include compounds denoted by $Li_aMe_bY_cX_6$. Herein, a+mb+3c=6 and c>0 are satisfied. Me is at least one element selected from the group consisting of metal elements other than Li and Y and metalloid elements. The value of m represents the valence of Me.

"Metalloid elements" denote B, Si, Ge, As, Sb, and Te.

"Metal elements" denote all elements included in group I to group XII of the periodic table (where hydrogen is excluded), and all elements included in group XIII to group XVI of the periodic table (where B, Si, Ge, As, Sb, Te, C, N, P, O, S, and Se are excluded).

Me may be at least one element selected from the group consisting of Mg, Ca, Sr, Ba, Zn, Sc, Al, Ga, Bi, Zr, Hf, Ti, Sn, Ta, and Nb.

Examples of the halide solid electrolyte include $Li_3YCl_6$ and $Li_3YBr_6$.

In the case in which the electrolyte layer 202 contains the solid electrolyte material according to the first embodiment, the negative electrode 203 may contain the sulfide solid electrolyte. Consequently, the sulfide solid electrolyte that is electrochemically stable to the negative electrode active material suppresses the solid electrolyte material according to the first embodiment and the negative electrode active material from coming into contact with each other. As a result, the internal resistance of the battery is reduced.

Examples of the organic polymer solid electrolyte include compounds of a polymer compound and a lithium salt. The polymer compound may have an ethylene oxide structure. Since the polymer compound having an ethylene oxide structure can contain a large amount of lithium salt, the ionic conductivity can be further enhanced.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. A lithium salt selected from these may be used alone. Alternatively, a mixture of at least two lithium salts selected from these may be used.

For the purpose of facilitating transfer of lithium ions and improving the output characteristics of the battery, at least one selected from the group consisting of the positive electrode 201, the electrolyte layer 202, and the negative electrode 203 may contain a nonaqueous electrolytic solution, a gel electrolyte, or an ionic liquid.

The nonaqueous electrolytic solution contains a nonaqueous solvent and a lithium salt dissolved in the nonaqueous solvent.

Examples of the nonaqueous solvent include cyclic carbonic acid ester solvents, chain carbonic acid ester solvents, cyclic ether solvents, chain ether solvents, cyclic ester solvents, chain ester solvents, and fluorine solvents.

Examples of the cyclic carbonic acid ester solvent include ethylene carbonate, propylene carbonate, and butylene carbonate.

Examples of the chain carbonic acid ester solvent include dimethyl carbonate, ethyl methyl carbonate, and diethyl carbonate.

Examples of the cyclic ether solvent include tetrahydrofuran, 1,4-dioxane, and 1,3-dioxolane.

Examples of the chain ether solvent include 1,2-dimethoxyethane and 1,2-diethoxyethane.

Examples of the cyclic ester solvent include γ-butyrolactone.

Examples of the chain ester solvent include methyl acetate.

Examples of the fluorine solvent include fluoroethylene carbonate, methyl fluoropropionate, fluorobenzene, fluoroethyl methyl carbonate, and fluorodimethylene carbonate.

A nonaqueous solvent selected from these may be used alone.

Alternatively, a mixture of at least two nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. A lithium salt selected from these may be used alone. Alternatively, a mixture of at least two lithium salts selected from these may be used. The concentration of the lithium salt may be, for example, greater than or equal to 0.5 mol/liter and less than or equal to 2 mol/liter.

Regarding the gel electrolyte, a polymer material impregnated with a nonaqueous electrolytic solution may be used. Examples of the polymer material include polyethylene oxides, polyacrylonitriles, polyvinylidene fluorides, polymethyl methacrylates, and polymers having an ethylene oxide bond.

Examples of the cation contained in the ionic liquid include
(i) aliphatic chain quaternary salts such as tetraalkylammonium or tetraalkylphosphonium.
(ii) aliphatic cyclic ammoniums such as pyrrolidinium, morpholinium, imidazolinium, tetrahydropyrimidinium, piperazinium, or piperidinium, and
(iii) nitrogen-containing-heterocyclic aromatic cations such as pyridinium or imidazolium.

Examples of the anion contained in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

For the purpose of improving the adhesiveness between particles, at least one selected from the group consisting of the positive electrode 201, the electrolyte layer 202, and the negative electrode 203 may contain a binder.

Examples of the binder include polyvinylidene fluorides, polytetrafluoroethylenes, polyethylenes, polypropylenes, aramid resins, polyamides, polyimides, polyamide-imides, polyacrylonitriles, polyacrylic acids, polyacrylic acid methyl esters, polyacrylic acid ethyl esters, polyacrylic acid hexyl esters, polymethacrylic acids, polymethacrylic acid methyl esters, polymethacrylic acid ethyl esters, polymethacrylic acid hexyl esters, polyvinyl acetates, polyvinylpyrrolidones, polyethers, polyether sulfones, hexafluoropolypropylenes, styrene-butadiene rubber, and carboxymethyl cellulose.

Copolymers may also be used as binders. Examples of such a binder include copolymers of at least two materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of at least two selected from the above-described materials may be used as the binder.

For the purpose of enhancing the electron conductivity, at least one selected from the positive electrode 201 or the negative electrode 203 may contain a conductive auxiliary.

Examples of the conductive auxiliary include
(i) graphite such as natural graphite or artificial graphite,
(ii) carbon black such as acetylene black or ketjenblack,
(iii) conductive fibers such as carbon fiber or metal fiber,
(iv) carbon fluoride
(v) metal powders such as aluminum,
(vi) conductive whiskers such as zinc oxide or potassium titanate,
(vii) conductive metal oxides such as titanium oxide, and
(viii) conductive polymer compounds such as polyanilines, polypyrroles, or polythiophenes.

To reduce a cost, the conductive auxiliary of (i) or (ii) above may be used.

Examples of the shape of the battery according to the second embodiment include a coin type, a cylindrical type, a square type, a sheet type, a button type, a flat type, and a stacked type.

EXAMPLES

The present disclosure will be described in more detail with reference to the examples.

Example 1

Production of Solid Electrolyte Material

Regarding raw material powders, LiCl, LiBr, LaOBr, and $LaCl_3$ at a $LiCl:LiBr:LaOBr:LaCl_3$ molar ratio of 0.3:0.5:1.0:0.4 were prepared in an argon atmosphere having a dew point lower than or equal to −60° C. (hereafter referred to as "dry argon atmosphere"). These raw material powders were pulverized and mixed in a mortar. In this manner, a mixture was obtained. Subsequently, a planetary ball mill was used, and the mixture was subjected to milling treatment for 12 hours at 500 rpm. In this manner, a powder of the solid electrolyte material according to Example 1 was obtained. The solid electrolyte material according to Example 1 had a composition denoted by $Li_{0.8}La_{1.4}OCl_{1.5}Br_{1.5}$.

Evaluation of Ionic Conductivity

Figure 3:
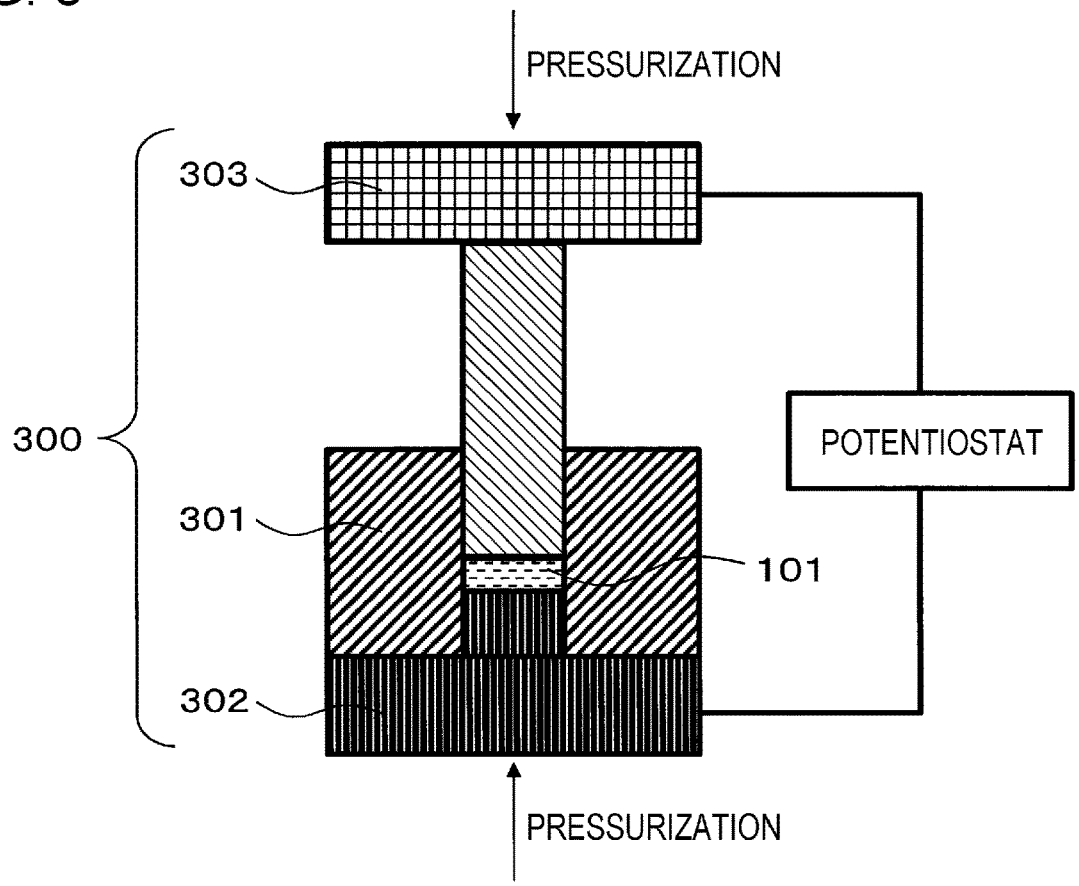
FIG. 3 is a schematic diagram of a pressure forming die 300 used for evaluating the ionic conductivity of a solid electrolyte material.

FIG. 3 is a schematic diagram of a pressure forming die 300 used for evaluating the ionic conductivity of the solid electrolyte material.

The pressure forming die 300 included a frame mold 301, a punch lower portion 302, and a punch upper portion 303. The frame mold 301 was formed of an insulating polycarbonate. Each of the punch lower portion 302 and the punch upper portion 303 was formed of stainless steel having electron conductivity.

The pressure forming die 300 illustrated in FIG. 3 was used, and the ionic conductivity of the solid electrolyte material according to Example 1 was measured by using the method described below.

The solid electrolyte material powder according to Example 1 (that is, the solid electrolyte material powder 101 in FIG. 3) was charged inside the pressure forming die 300 in a dry argon atmosphere having a dew point lower than or equal to −30° C. A pressure of 400 MPa was applied to the powder of the solid electrolyte material according to Example 1 inside the pressure forming die 300 by using the punch upper portion 303.

The punch lower portion 302 and the punch upper portion 303 were connected to a potentiostat (VersaSTAT4 produced by Princeton Applied Research) incorporated with a frequency-response analyzer while the pressure was applied. The punch upper portion 303 was connected to a working electrode and a potential-measurement terminal. The punch lower portion 302 was connected to a counter electrode and a reference electrode. The ionic conductivity of the solid electrolyte material was measured at room temperature by using an electrochemical impedance measuring method.

Figure 4:
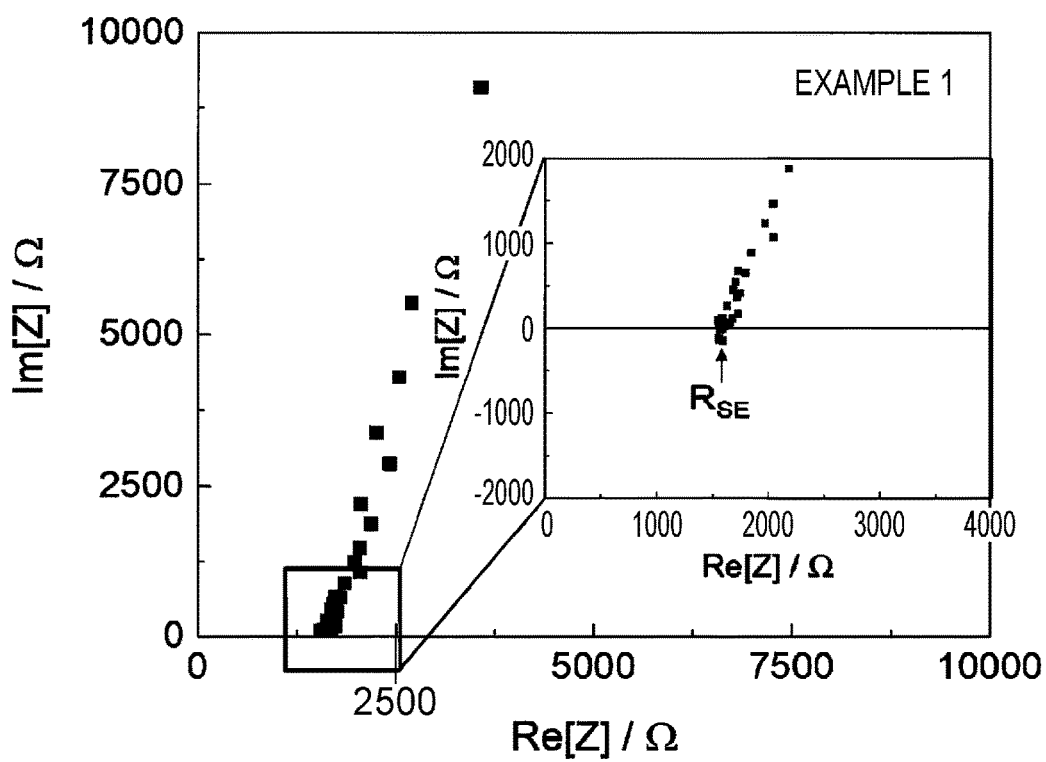
FIG. 4 is a graph illustrating a Cole-Cole diagram of impedance measurement results of a solid electrolyte material according to Example 1.
Figure 5:
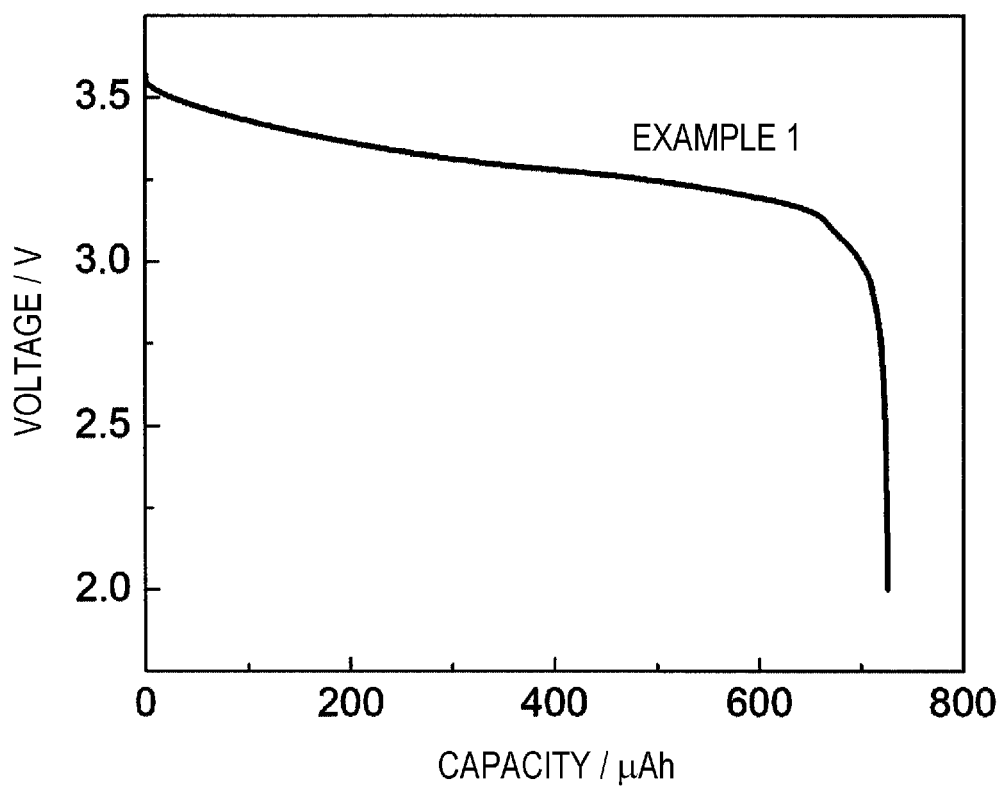
FIG. 5 is a graph illustrating the initial charge-discharge characteristics of a secondary battery according to Example 1.

FIG. 4 illustrates the Cole-Cole diagram of impedance measurement results of the solid electrolyte material according to Example 1.

In FIG. 4, the real value of the impedance at a measurement point at which the absolute value of the phase of the complex impedance is the smallest was assumed to be the resistance value with respect to the ionic conduction of the solid electrolyte material. Refer to arrow $R_{SE}$ illustrated in FIG. 4 for the real value.

The resistance value was used, and the ionic conductivity was calculated on the basis of Mathematical formula (2) below.

$$\sigma = (R_{SE} \times S/t)^{-1} \qquad (2)$$

Here, σ represents ionic conductivity, S represents a contact area between the solid electrolyte material and the punch upper portion 303 (equal to the cross-sectional area of the hollow portion of the frame mold 301 in FIG. 3), $R_{SE}$ represents the resistance value of the solid electrolyte material according to the impedance measurement, and t represents the thickness of the solid electrolyte material to which the pressure was applied (equal to the thickness of the layer formed of the solid electrolyte material powder 101 in FIG. 3).

The ionic conductivity measured at 23° C. of the solid electrolyte material according to Example 1 was $3.58 \times 10^{-5}$ S/cm.

Production of Secondary Battery

In a dry argon atmosphere, the solid electrolyte material according to Example 1 and $LiCoO_2$ at a volume ratio of 40:60 were prepared. These materials were mixed in a mortar so as to obtain a mixture.

Regarding raw material powders, LiCl and $YCl_3$ at a LiCl:$YCl_3$ molar ratio of 3:1 were prepared. These materials were pulverized and mixed in a mortar. Subsequently, a planetary ball mill was used, the LiCl and the $YCl_3$ were subjected to milling treatment for 12 hours at 500 rpm. In this manner, a halide solid electrolyte was obtained. The resulting halide solid electrolyte had a composition denoted by $Li_3YCl_6$.

A multilayer body was obtained by stacking $Li_3YCl_6$ (80 mg) and the above-described mixture (11.7 mg) in an insulating tube having an inner diameter of 9.5 mm. A pressure of 300 MPa was applied to the resulting multilayer body so as to form a first electrode and a solid electrolyte layer. The resulting solid electrolyte layer had a thickness of 700 μm.

Subsequently, In metal (thickness: 200 μm) was stacked on the solid electrolyte layer. A pressure of 80 MPa was applied to the resulting multilayer body so as to form a second electrode. The first electrode was a positive electrode, and the second electrode was a negative electrode.

Collectors formed of stainless steel were attached to the first electrode and the second electrode, and collector leads were attached to the respective collectors.

Finally, the inside of the insulating tube was blocked from the outside-air atmosphere and hermetically sealed by using an insulating ferrule.

In this manner, the secondary battery according to Example 1 was obtained.

Charge-Discharge Test

The resulting secondary battery was placed in a constant-temperature bath at 25° C.

The battery according to Example 1 was charged until the voltage reached 3.6 V at a current density of 27.1 μA/cm². The above-described current density corresponds to a rate of 0.02 C.

Subsequently, the battery according to Example 1 was discharged until the voltage reached 2.0 V at a current density of 27.1 μA/cm². The above-described current density corresponds to a rate of 0.02 C.

According to the result of the charge-discharge test, the secondary battery according to Example 1 had an initial discharge capacity of 727 μAh.

Examples 2 to 14

In Examples 2 to 4, regarding raw material powders, LiCl, LaOCl, and $LaCl_3$ at a LiCl:LaOCl:$LaCl_3$ molar ratio of (2+b−3a):1.0:(a−1) were prepared.

In Example 5, regarding raw material powders, $Li_2O$ and $LaCl_3$ at a $Li_2O$:$LaCl_3$ molar ratio of 1.0:2.0 were prepared.

In Examples 6 to 9, regarding raw material powders, LiBr, LaOBr, and $LaBr_3$ at a LiBr:LaOBr:$LaBr_3$ molar ratio of (2+b−3a):1.0:(a−1) were prepared.

In Examples 10 and 11, regarding raw material powders, LiBr and LaOCl at a LiBr:LaOCl molar ratio of (2+b−3a):1.0 were prepared.

In Example 12, regarding raw material powders, LiI, LaOCl, and $LaCl_3$ at a LiI:LaOCl:$LaCl_3$ molar ratio of 0.8:1.0:0.4 were prepared.

In Example 13, regarding raw material powders, LiI and LaOBr at a LiI: LaOBr molar ratio of 0.5:1.0 were prepared.

In Example 14, regarding raw material powders, LiI, LaOBr, and $LaCl_3$ at a LiI:LaOBr:$LaCl_3$ molar ratio of 0.8:1.0:0.4 were prepared.

Solid electrolyte materials according to Examples 2 to 14 were obtained by the same experiment as in Example 1 except the above. The values of a and b are described in Table 1.

The ionic conductivity of the solid electrolyte material according to each of Examples 2 to 14 was measured in the same manner as in Example 1. Measurement results are described in Table 1.

Secondary batteries were obtained by using the solid electrolyte materials according to Examples 2 to 14 in the same manner as in Example 1. The secondary batteries according to Examples 2 to 14 had favorable charge-discharge characteristics in the same manner as in Example 1.

TABLE 1

| | Composition | a | b | X | Ionic conductivity [S/cm] |
|---|---|---|---|---|---|
| Example 1 | $Li_{0.8}La_{1.4}OCl_{1.5}Br_{1.5}$ | 1.40 | 3.00 | Cl, Br | $3.58 \times 10^{-5}$ |
| Example 2 | $Li_{0.8}La_{1.4}OCl_3$ | 1.40 | 3.00 | Cl | $1.88 \times 10^{-5}$ |
| Example 3 | $Li_{1.4}La_{1.2}OCl_3$ | 1.20 | 3.00 | Cl | $4.09 \times 10^{-6}$ |

TABLE 1-continued

| | Composition | a | b | X | Ionic conductivity [S/cm] |
|---|---|---|---|---|---|
| Example 4 | $Li_2LaOCl_3$ | 1.00 | 3.00 | Cl | $1.64 \times 10^{-6}$ |
| Example 5 | $Li_2La_2OCl_6$ | 2.00 | 6.00 | Cl | $2.37 \times 10^{-5}$ |
| Example 6 | $Li_{0.8}La_{1.4}OBr_3$ | 1.40 | 3.00 | Br | $6.83 \times 10^{-5}$ |
| Example 7 | $Li_{1.4}La_{1.2}OBr_3$ | 1.20 | 3.00 | Br | $1.82 \times 10^{-5}$ |
| Example 8 | $Li_{0.5}La_{1.5}OBr_3$ | 1.50 | 3.00 | Br | $4.57 \times 10^{-5}$ |
| Example 9 | $Li_2LaOBr_3$ | 1.00 | 3.00 | Br | $1.38 \times 10^{-5}$ |
| Example 10 | $Li_2LaOClBr_2$ | 1.00 | 3.00 | Cl, Br | $3.94 \times 10^{-6}$ |
| Example 11 | $LiLaOClBr$ | 1.00 | 2.00 | Cl, Br | $2.43 \times 10^{-6}$ |
| Example 12 | $Li_{0.8}La_{1.4}OCl_{2.2}I_{0.8}$ | 1.40 | 3.00 | Cl, I | $4.07 \times 10^{-5}$ |
| Example 13 | $Li_{0.5}LaOBrI_{0.5}$ | 1.00 | 1.50 | Br, I | $1.02 \times 10^{-5}$ |
| Example 14 | $Li_{0.8}La_{1.4}OCl_{1.2}BrI_{0.8}$ | 1.40 | 3.00 | Cl, Br, I | $3.19 \times 10^{-5}$ |

Consideration

As is clear from Table 1, the solid electrolyte materials according to Examples 1 to 14 have high lithium ion conductivity higher than or equal to $1\times10^{-6}$ S/cm.

As is clear from comparisons of Examples 1 and 6 with Example 2 or Comparisons of Examples 9 to 11 with Example 4, in the case in which X contains Br, the ionic conductivity increases.

As is clear from comparisons of Example 12 with Example 2, in the case in which X contains I, the ionic conductivity increases.

In all Examples 1 to 14, the batteries were charged and discharged at room temperature.

Since the solid electrolyte materials according to Examples 1 to 14 do not contain sulfur, hydrogen sulfide is not generated.

As described above, the solid electrolyte material according to the present disclosure does not generate hydrogen sulfide, has high lithium ion conductivity, and is suitable for providing a battery that can be favorably charged and discharged.

The solid electrolyte material according to the present disclosure is used for, for example, all-solid lithium ion secondary batteries.

What is claimed is:

1. A lithium ion conductive solid electrolyte material consisting of
    Li, La, O, and X,
    wherein X is at least one element selected from the group consisting of Cl, Br, and I,
    wherein the lithium ion conductive solid electrolyte material is denoted by Composition formula (1) below, $$Li_{2+b-3a}La_aOX_b \quad (1)$$

wherein mathematical formulae below $$1.0 \leq a \leq 2.0,$$

$$1.5 \leq b \leq 6.0, \text{ and}$$

$$a \leq 2+b-3a,$$

are satisfied.

2. The lithium ion conductive solid electrolyte material according to claim 1,
    wherein the amount of moles of X contained is greater than the amount of moles of O contained.

3. The lithium ion conductive solid electrolyte material according to claim 1,
    wherein X contains at least one element selected from the group consisting of Br and I.

4. A battery comprising:
    a positive electrode;
    a negative electrode; and
    an electrolyte layer disposed between the positive electrode and the negative electrode,
    wherein at least one selected from the group consisting of the positive electrode, the negative electrode, and the electrolyte layer contains the lithium ion conductive solid electrolyte material according to claim 1.

5. A lithium ion conductive solid electrolyte material comprising
    Li, La, O, and X,
    wherein X is at least one element selected from the group consisting of Cl, Br, and I, and
    wherein the amount of moles of X contained is greater than the amount of moles of O contained.

6. The lithium ion conductive solid electrolyte material according to claim 5,
    wherein the lithium ion conductive solid electrolyte material is denoted by Composition formula (1) below, $$Li_{2+b-3a}La_aOX_b \quad (1)$$

wherein mathematical formulae below $$1.0 \leq a \leq 2.0,$$

$$1.5 \leq b \leq 6.0, \text{ and}$$

$$0.5 \leq 2+b-3a$$

are satisfied.

7. The lithium ion conductive solid electrolyte material according to claim 5,
    wherein X contains at least one element selected from the group consisting of Br and I.

8. A battery comprising:
    a positive electrode;
    a negative electrode; and
    an electrolyte layer disposed between the positive electrode and the negative electrode,
    wherein at least one selected from the group consisting of the positive electrode, the negative electrode, and the electrolyte layer contains the lithium ion conductive solid electrolyte material according to claim 5.

9. A lithium ion conductive solid electrolyte material comprising
    Li, La, O, and X,
    wherein X is at least one element selected from the group consisting of Cl, Br, and I, and
    wherein the lithium ion conductive solid electrolyte material is denoted by Composition formula (1) below, $$Li_{2+b-3a}La_aOX_b \quad (1)$$

wherein mathematical formulae below $$1.0 \leq a \leq 2.0,$$

$$1.5 \leq b \leq 6.0, \text{ and}$$

$$0.5 \leq 2+b-3a$$

are satisfied.

10. The lithium ion conductive solid electrolyte material according to claim 9,
    wherein X contains at least one element selected from the group consisting of Br and I.

11. A battery comprising:
a positive electrode;
a negative electrode; and
an electrolyte layer disposed between the positive electrode and the negative electrode,
wherein at least one selected from the group consisting of the positive electrode, the negative electrode, and the electrolyte layer contains the lithium ion conductive solid electrolyte material according to claim 9.

* * * * *